United States Patent [19]

Moosz

[11] Patent Number: 4,692,863

[45] Date of Patent: Sep. 8, 1987

[54] ELECTRONIC APPARATUS FOR GENERATING SETS OF NUMERICAL VALUES FOR PLAYING LOTTERY GAMES

[76] Inventor: Alexander P. Moosz, 240 Cadillac, Beaconsfield, Quebec, Canada

[21] Appl. No.: 712,725

[22] Filed: Mar. 18, 1985

[51] Int. Cl.4 ........................ G06F 15/28; G06F 15/44

[52] U.S. Cl. .................................... 364/412; 364/410; 364/717; 273/138 A

[58] Field of Search ................................ 364/410-412, 364/717; 377/4-5; 273/85 G, 138 A; 194/30, DIG. 11

[56] References Cited

U.S. PATENT DOCUMENTS

| | | | |
|---|---|---|---|
| 3,786,234 | 1/1974 | Trent et al. | 364/412 X |
| 4,151,404 | 4/1979 | Harrington et al. | 364/717 X |
| 4,161,041 | 7/1979 | Butler et al. | 364/717 X |
| 4,323,770 | 4/1982 | Dieulot et al. | 364/412 X |
| 4,398,708 | 8/1983 | Goldman et al. | 273/138 A Z |
| 4,448,419 | 5/1984 | Telnaes | 273/138 A X |
| 4,494,197 | 1/1985 | Troy et al. | 364/412 |
| 4,527,798 | 7/1985 | Siekierski et al. | 273/138 A X |
| 4,573,681 | 3/1986 | Okada | 364/412 X |

*Primary Examiner*—Gary V. Harkcom
*Attorney, Agent, or Firm*—Larson & Taylor

[57] ABSTRACT

A system and an electronic apparatus for generating combinations of numbers for playing lottery games such as 6/36, 6/44 and 6/49. A keyboard allows the player to enter a series of preferred numbers from which the numbers of each combination are to be taken, and a redundancy index which determines the prize group required by the player. A processor with a memory generates combinations of numbers according to stored model combinations and a visual display informs the player of the selected mode of operation and of the status of the operation, and it displays the generated combinations. This type of device could also be decribed in a jargon term used by some lottery players as an electronic "wheeling system and apparatus". Other modes of operation are available to complement the combination generation function.

22 Claims, 11 Drawing Figures

AMOUNT OF COMBINATIONS GENERATED FOR FAVOURITE NUMBERS (n) / PRIZE GROUP (P)

| p \ n | 8 | 9 | 10 | 11 | 12 | 13 | 14 | 15 | 16 | 17 | 18 |
|---|---|---|---|---|---|---|---|---|---|---|---|
| 3 | * | * | 2 | *2 | 4 | *4 | 7 | *7 | 9 | 13 | 17 |
| 4 | * | 3 | *3 | 6 | 14 | 23 | 26 | 37 | 52 | 71 | 92 |
| 5 | 4 | 8 | 18 | 34 | 68 | 116 | 203 | ** | ** | ** | ** |

* not efficient

** not economical due to the amount of sets to be wagered

ELECTRONIC APPARATUS FOR GENERATING SETS OF NUMERICAL VALUES FOR PLAYING LOTTERY GAMES

FIELD OF THE INVENTION

The present invention relates to a system and an apparatus for generating combinations of numbers to be used when betting in lottery games of the 6/36, 6/44, 6/49 etc. type. More particularly, the invention affords the generation of combinations of numbers taken from a group of numbers which have been selected by the player and wherein a desired prize group selection is exercised according to the wishes of the player.

BACKGROUND OF THE INVENTION

Lottery games of the above-mentioned type are well known. The player selects numbers from within the allowed range of say 1 to 49 to form one or more combination of 6 numbers. Cards are filled out with the selected combinations and presented to a lottery office taking stakes. After the draw, normally on a weekly basis, the winners of the full combination of 6 numbers share the main prize and subsidiary prizes are won by the players whose bets comprise winning sub-combinations of 5 numbers plus the bonus number (5/6+, if applicable), or of 5 numbers (5/6 prize group), or of 4 numbers (4/6 prize group), and usually much lesser amounts are won by those having selected combinations comprising only 3 winning numbers (3/6) prize group), by far the easiest prizes to win.

These lottery games may be more generally expressed as m/k where m is the amount of distinct numbers forming a combination $C_j$ the distinct numbers being chosen from an array of consecutive numbers ranging from 1 to k. In a 6/49 lottery, k equals 49 and m equals 6. The 6/49, 6/44 and the 6/36 lotteries are quite common and they are among the most popular legal lotteries.

Devices for randomly generating combinations of numbers to be used in these lottery games are already known. These known devices operate either electronically or mechanically and can be of various types and sizes. An example of such a device is described in U.S. Patent to Harrington et al U.S. Pat. No. 4,151,404 issued on Apr. 24, 1979.

These prior devices suffer from a major drawback in that they operate only in the random mode, and consequently the user has no control over the selection process. Numerous players prefer to use certain favorite numbers in the combinations on which they place their stakes. These favorite numbers may be, for example, the user's date of birth or any sets of numbers that the player wishes to adopt when placing his stakes. Since the prior art devices operate in a random selection mode only, they do not generate combinations containing pre-selected or favourite numbers and therefore they do not allow for the user's input.

Furthermore, when the user wishes to bet numerous combinations in a given draw, it is desirable to use a device which will generate the combinations according to a methodological approach for eliminating at least some degree of redundancy among the played combinations. This is quite useful when a person (or group of players) decides to invest on say 100 combinations with the intention of winning subsidiary prizes without eliminating the chances for a main size.

OBJECTS AND STATEMENT OF THE PRESENT INVENTION

Accordingly, it is an object of the present invention to provide a simple electronic device which is instructible by the user and which provides some guidance to assist him in the possibility of winning subsidiary prizes and which generates combinations from a set of favourite numbers selected by the player.

Another object of this invention is to provide electronic devices which will generate combinations of numbers according to a methodological approach.

A further object is to provide an electronic apparatus having different modes of operation, including, in addition to a combination generation mode, a random number selection mode, a random combination selection mode, permutation mode for daily draws, and means for determining which of the wagered combinations are winning along with the prize category.

The device operates in a weighted combination generation mode which consist of forming combinations $C_j$ with numbers taken exclusively from a group of preselected or favourite numbers which have been chosen by the player and entered via the keyboard. This group of pre-selected numbers constitutes a sub-array $a_i$ containing n distinct numbers. Sub-array $a_i$ contains numbers which are within the range of numbers from 1 to k. Then the user enters the prize group p of his choice, being a number reflecting the degree of redundancy tolerated or the desired minimum prize win should all m numbers drawn be among the n favourite numbers selected ($m<n$).

Therefore two combinations $C_j$ having p or more numbers in common cannot be accepted; only one of these combinations will be generated, the other being eliminated as redundant.

Accordingly, sub-array $a_i$ and value p are two main parameters selected by the player to control the combinations $C_j$ to be generated by the apparatus. In a particular embodiment of this invention the apparatus may be operated with the value of $m=6$, value n ranging from 8 to 18, and with a choice of value p of 3, 4 and 5.

Once sub-array $a_i$ and the value p have been entered, the processor generates one by one, a plurality of combinations $C_j$ formed of m numbers taken from sub-array $a_i$. The restriction placed upon the generation of these combinations $C_j$ is such that no two generated combinations will contain p identical numbers or more (i.e. repeated). The following example with four combinations illustrates the process:

| | |
|---|---|
| 1 8 10 14 21 33 (1) | 1 8 10 12 33 35 (3) |
| 1 14 15 16 22 33 (2) | 1 8 14 15 16 22 (4) |

If combination (1) has already been generated, combinations (2)(3) and (4) would be eliminated for prize group 3/6 (i.e. $p=3$); for selected $p=4$, if combination (1) has been generated combination (2) would also remain and be generated, while (3) and (2) would be eliminated; for selected $p=5$, (1), (2), and (3) would remain and be generated while (4) would be eliminated as a result of repeating the sub-combination 1, 14, 15, 16, 22 as appearing in (2).

Finally, the combinations $C_j$ generated by the processor are displayed in succession on the visual display.

Therefore, the device guaranties to the user that for a given prize group p and sub-array $a_i$, and if the numbers of the winning combination are all among sub-array $a_i$ at least one of the generated combinations $C_j$ will have p numbers in common with the winning combination, in other words, will win a prize.

The processor may also be designed for verifying which, if any, of the generated combinations $C_j$ correspond to the winning combination and to the winning sub-combinations. To this end, the processor generates the combinations $C_j$ according to the parameters selected by the user, and compares each one of these combinations $C_j$ with the winning combination in order to establish how many numbers they have in common. Normally, the least prize group being 3/6, the processor retains the combinations that have three or more numbers in common with the winning combination and causes same to be displayed in succession with an indication of the prize group in each case.

The processor may also calculate the number of combinations $C_j$ that can be generated for a given number of selected numbers n and for a given prize group p. This feature allows the user to "tailor" his selections according to the sums he wishes to put at stake.

In addition to the weighted generation mode described thus far, the processor can also be operated in a random generation mode. This mode may be used for (a) randomly generating combinations of 6 numbers within a range defined by the user; (b) individual random numbers, also within a range defined by the user; (c) random permutations of 3, 4 or 5 digits or size q, each digit ranging from 0 to 9 (e.g. 000-999, 0000-9999 and 00000-99999). A detailed description of the random operation mode is not deemed to be necessary since it is well known in the art.

The device may also be provided with a printer interface capable of being connected to a printer with a ribbon of paper, in order to print out the generated combinations $C_j$ and some other elements of information displayed.

Therefore the present invention comprises in a most general aspect an electronic apparatus for generating combinations of numbers to be used by a player when selecting his bets for a lottery game of the 6/36, 6/44 or 6/49 type more generally expressed as m/k wherein m is the number of distinct numbers forming a combination $C_j$ and wherein said distinct numbers being chosen from an array $A_k$ constituted by a number k of consecutive numbers usually ranging from 1 to k, said apparatus generating a plurality of combinations $C_j$ taking into consideration parameters and preferences dictated by the player, said apparatus comprising:

input means for entering n distinct selected numbers chosen from said array $A_k$ thus forming a sub-array $a_i$ wherein n is greater than m (specifically $>8$) and less than k, and for entering p, a redundancy index whose numerical value is less than m;

processor means operatively connected to said keyboard means for storing said n distinct selected numbers and said redundancy index p, said processor means successively generating a comprehensive series of combinations $C_j$ of said distinct selected numbers n chosen from said sub-array $a_i$, the combinations $C_j$ from said comprehensive series satisfying a predetermined relationship with the selected redundancy index p;

output means operatively connected to said processor means for successively outputting the combinations $C_j$ generated by said processor means.

DESCRIPTION OF A PREFERRED EMBODIMENT

Figure 1:
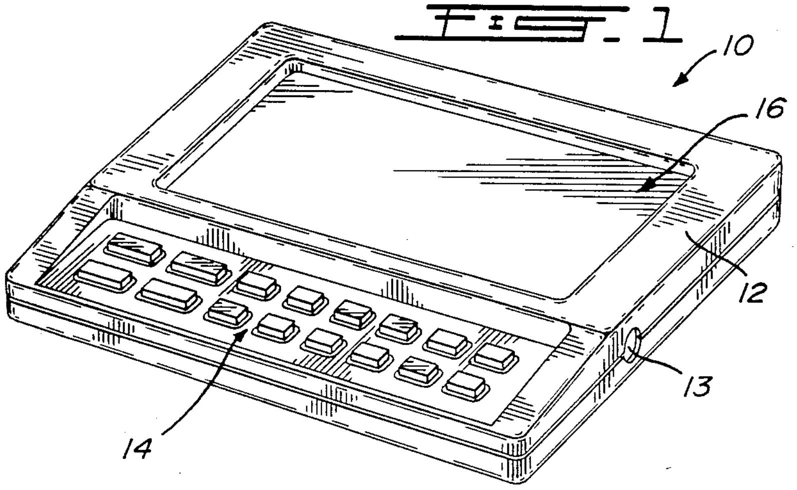
FIG. 1 is a perspective view of a pocket size apparatus embodying the present invention.

With reference to FIG. 1, the device shown is a pocket size apparatus 10 having a housing 12, a keyboard 14 and a visual display 16 preferably of the liquid crystal display type (LCD).

Figure 3:
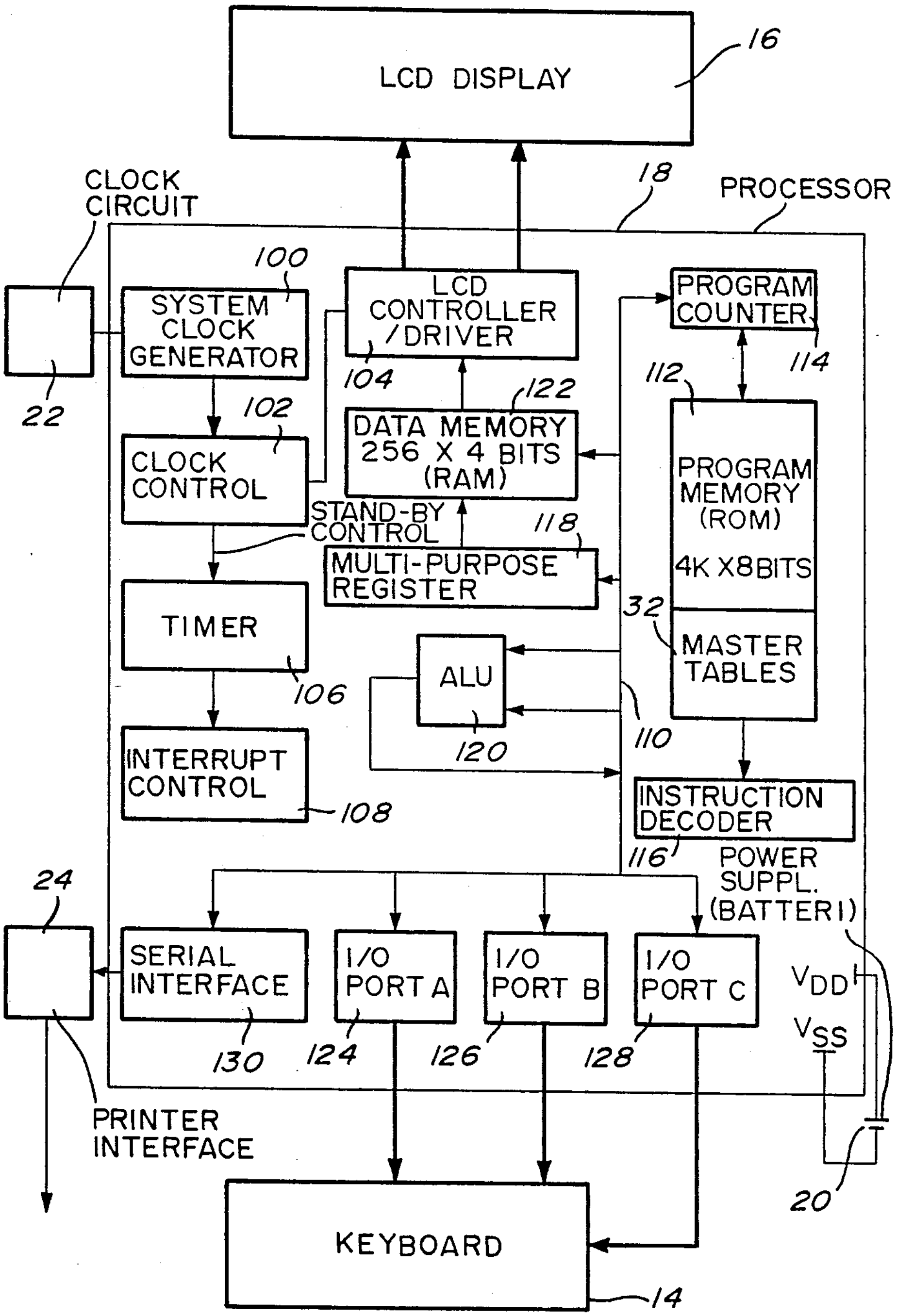
FIG. 3 is a block diagram of the apparatus of FIGS. 1 and 2.

Referring to FIG. 3, the electronic circuit of apparatus 10 comprises a processor 18 which controls the operations of apparatus 10 and is connected to keyboard 14 and to display 16. Processor 18 is connected to a power supply 20, for example miniature batteries. However, the power supply may also be constituted by an appropriate voltage regulator connected to an electrical wall outlet (not shown).

Processor 18 is timed by a clock circuit 22 which is of a known construction. Also, if desired, a printer interface 24 of known construction may be connected to processor 18 for running a printer (not shown).

Figure 4:
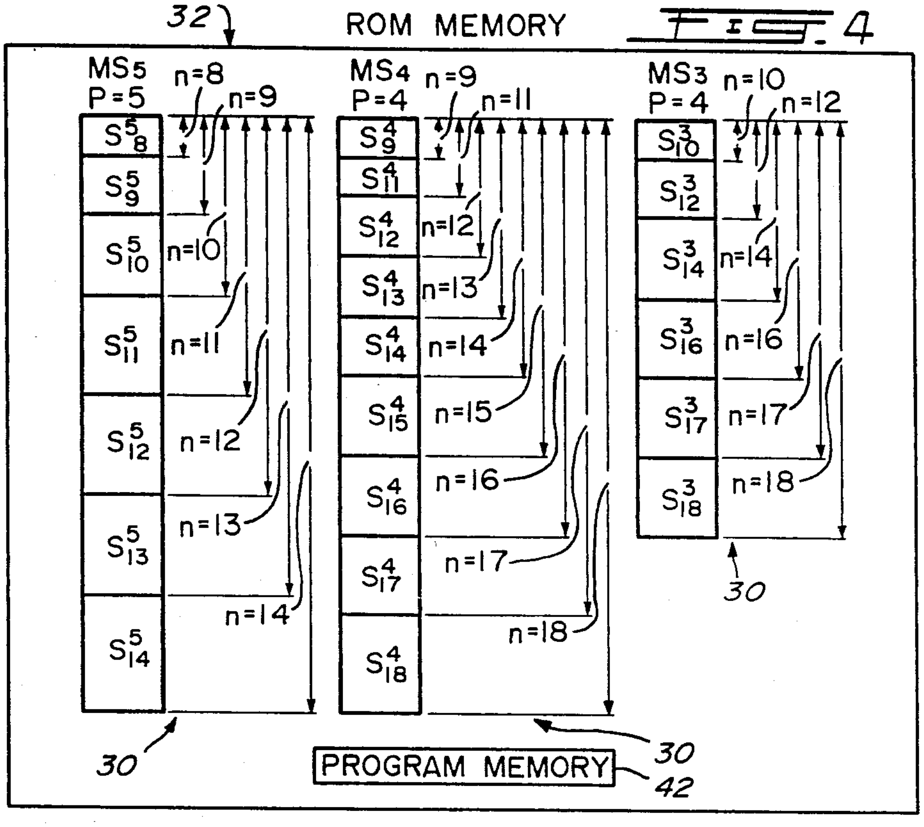
FIG. 4 is a block diagram, of the read-only memory (ROM) of the processor means of the apparatus of FIGS. 1, 2 and 3.
Figure 7C:
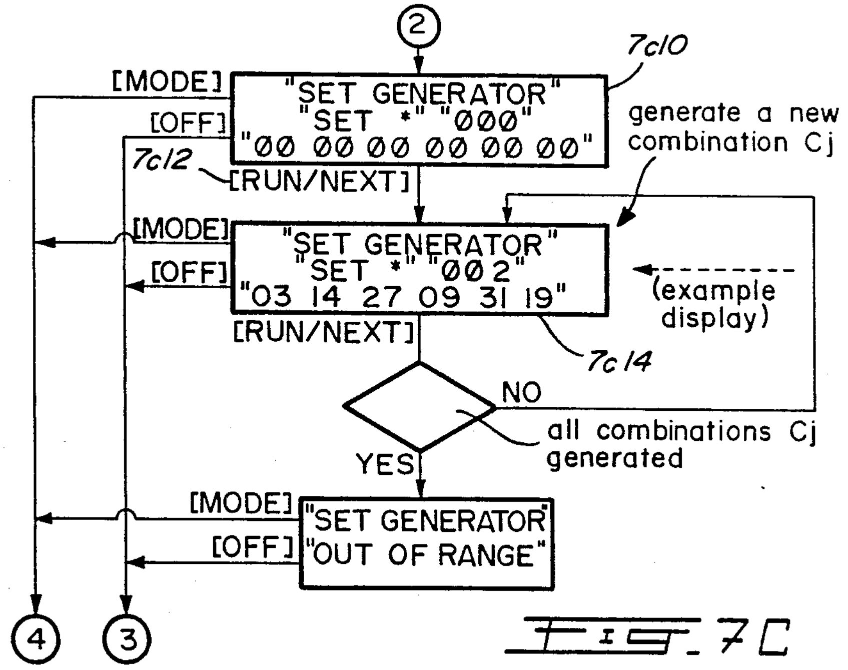

With reference to FIGS. 3 and 4, illustrating schematically the internal construction of processor 18, the latter comprises a plurality of read-only memory areas 30 (hereinafter "ROM areas").

There is one ROM area 30 for every value of p with which the apparatus is designed to operate. Each ROM area 30 contains a model set $MS_p$ comprising a plurality of model combinations $MC_j$ representing the combinations $C_j$ which have to be generated for the associated value of p and the maximum allowed value of n, which, in a particular embodiment, is 18. Each model combination $MC_j$ is constituted by m elements appearing in increasing order and according to which favourite numbers from the sub-array $a_i$ are grouped in order to constitute a combination $C_j$. The detailed method or process followed by the processor 18 for constructing a combination $C_j$ from a model combination $MC_j$ will be explained later.

Each model set $MS_p$ is constituted by a plurality of subsets $S^p{}_n$, there being one subset $S^p{}_n$ for every valid value of n. Any subset $S^p{}_n$ includes all the model combinations $MC_j$ of every subset for lesser n values. This arrangement may be visualized in FIG. 4. The ROM area 30 corresponding to a value of $p=5$, is constructed as a table, the model combinations $MC_j$ being stored in a consecutive order therein. The subset $S_{10}{}^5$ corresponding to values of p and n of 5 and 10, respectively, contains the model combinations $MC_j$ of both subsets $S_8{}^5$ and $S_9{}^5$.

This may be expressed mathematically as $S^p_{n-1}$ $S^p_n$

It should be understood that the ROM areas 30 are permanent and they cannot be altered by the user. The models are created during manufacture of apparatus 10 and the user has no control over the content of memory 32. Each ROM area 30 has an access address and the operation of processor 18 will now be explained with reference to FIG. 5 using the of ROM area 30 as an example which corresponds to a value of p=3 containing the subset $S_{10}^3$ of models associated to a value of n=10.

Figures 5, 6:
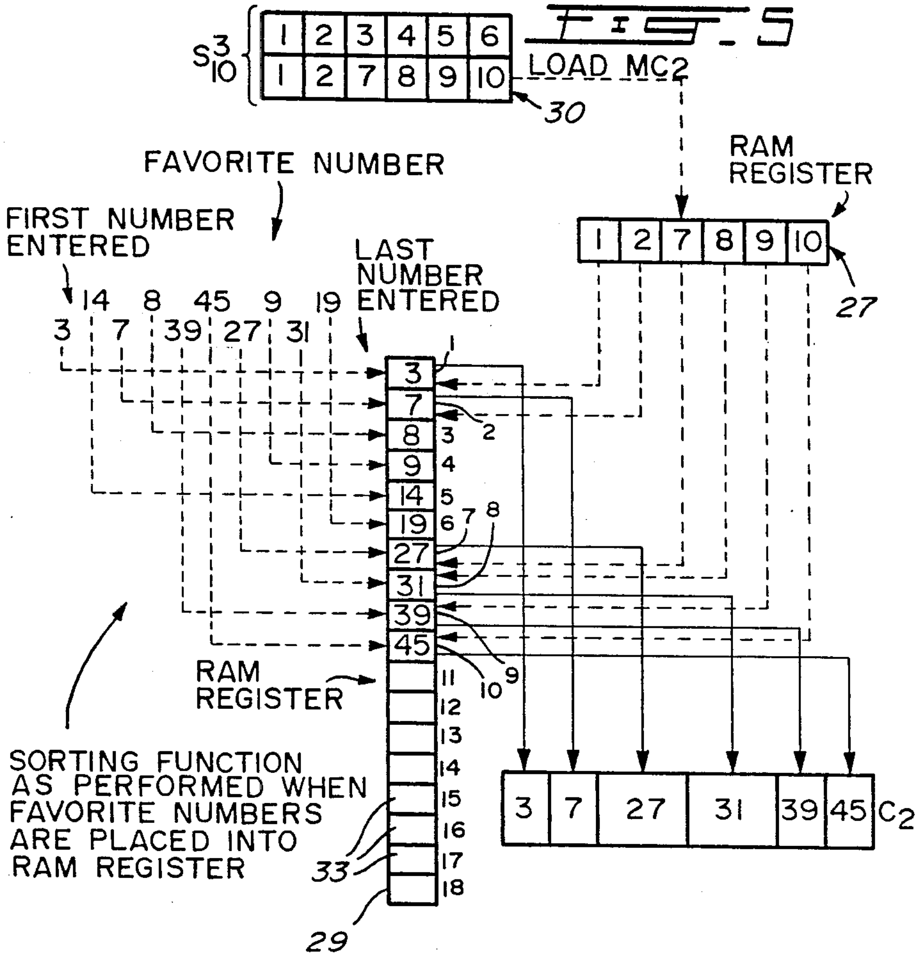
FIG. 5 is a block diagram illustrating the operation of the device for a particular set of p and n values.
FIG. 6 is a typical table giving the number of combinations generated for different p and n values; and FIGS. *7a* to *7e* are flow charts illustrating the operation of the apparatus embodying the present invention.
Figure 7A:
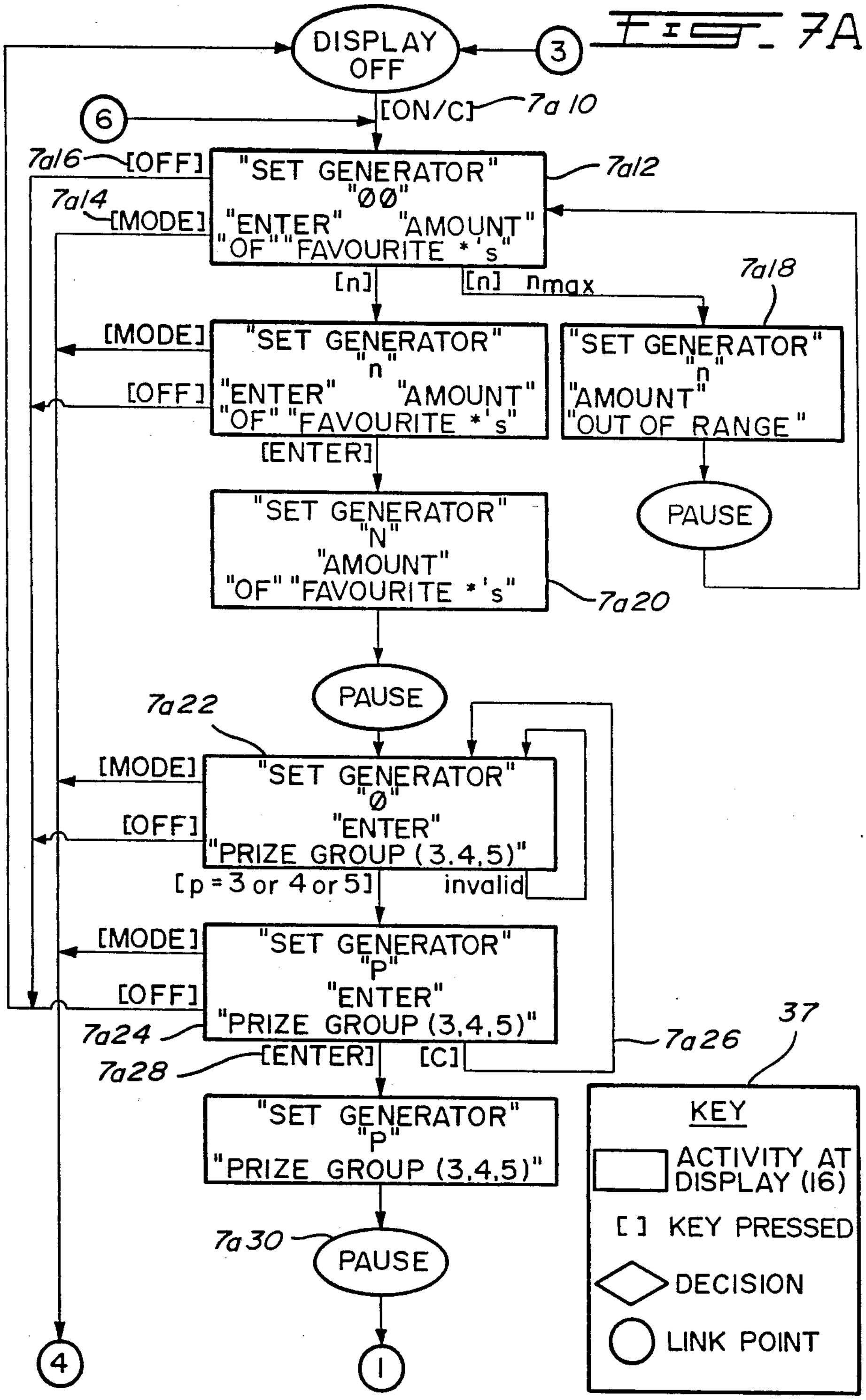
Figure 7B:
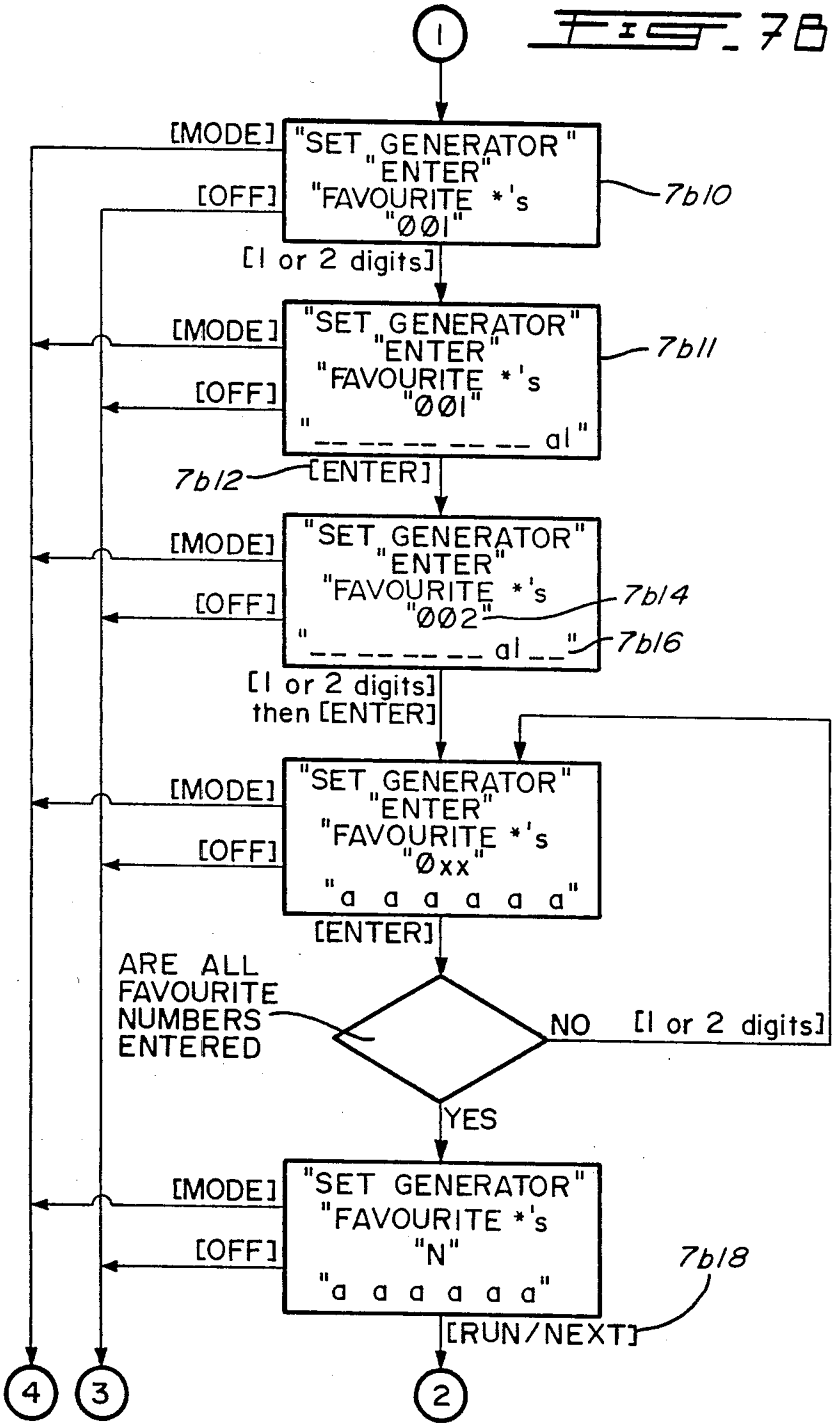
Figure 7D:
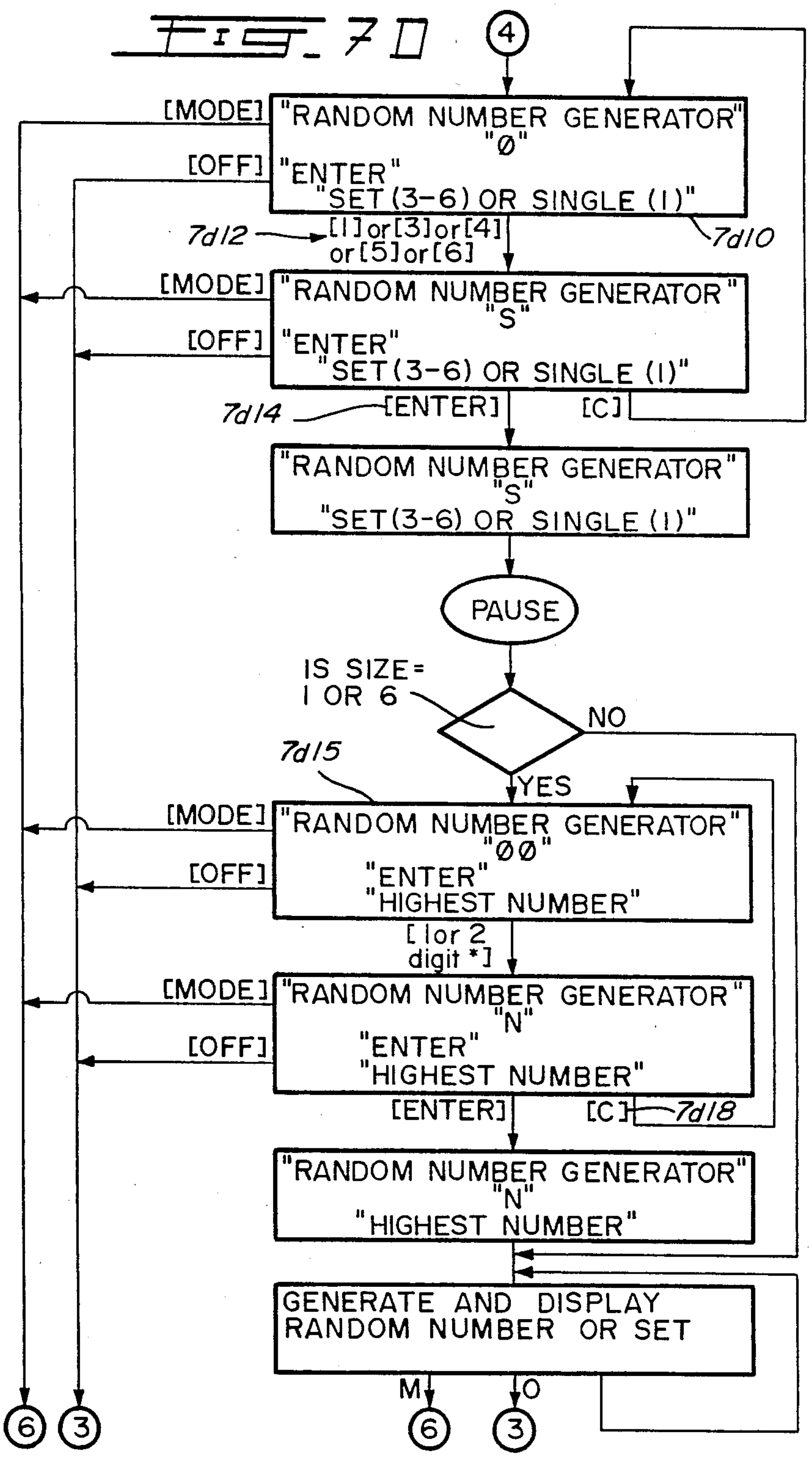
Figure 7E:
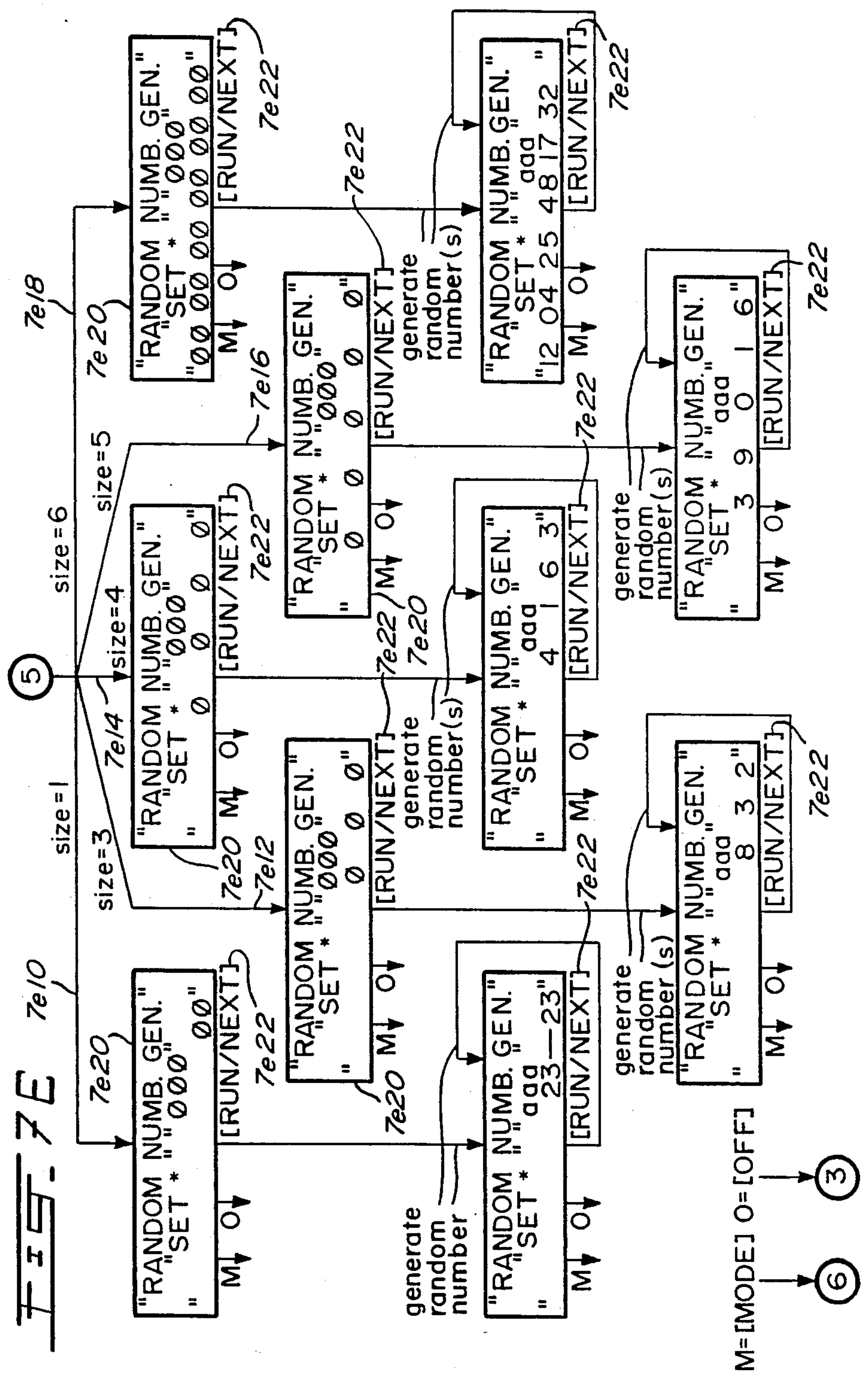

Processor 18 also comprises two random access memory registers (hereinafter "RAM registers") 27 and 29, (FIG. 5). Processor 18 loads in RAM register 29 sub-array $a_i$ whose values are selected by the user. As the favourite numbers are entered by the user, processor 18 performs a sort function upon the number with respect to the array $a_i$, thus placing the elements of array $a_i$ in an ascending order.

RAM register 29 has a plurality of individual storage locations 33 for receiving the selected numbers of array $a_i$; in the present example, eighteen slots 33 are required. Each slot of RAM register 29 is accessed by an address which, for the purpose of clarity, has been designated by the numbers from 1 to 18.

Once all the entries i.e. values p, n and sub-array $a_i$ have been made via keyboard 14 by the user, processor 18 accesses the ROM area 30 and the subset $S^P$n therein corresponding respectively to the selected values of p and n. The example is for p=3 and for sub-array $a_i$ of 10 numerical values as entered by the user are 3 14 7 8 39 45 27 9 31 19.

Subset $S_{10}^3$, for n=10 in ROM area 30 associated to for p=3, can have only two model combinations $MC_j$, for instance 1-2-3-4-5-6 and 1-2-7-8-9-10. These 2 model combinations are permanently programmed, therein, the elements of each model combinations being stored in increasing order.

Subsequently the processor 18 loads, one at a time, the model combinations $MC_j$, from subset $S_{10}^3$ into RAM register 27. The generated combinations $C_j$ will automatically be displayed with their numbers in increasing order.

Thus, the first combination generated would be 3-7-8-9-14-19 and the second one would be 3-7-27-31-39-45 by using each number of the model combination $MC_j$ as an index to the array $a_i$. These generated combinations $C_j$ are then successively displayed by display 16.

For other sets of n and p values the number of model combinations $MC_j$ (i.e. the size of the subset of combinations $S^P_n$ will vary as shown in the table of FIG. 6).

This table applies for one particular set of model combinations. However, different model combinations may be programmed which may result in slightly different values for such a table.

Also keeping in mind that to one combination $C_j$ generated corresponds one model combination $MC_j$, therefore from this table may also be determined the amount of combinations stored in ROM area 30.

It should be noted that for a p=3 and n=10 or n=11, in both cases there are only two model combinations:

1-2-3-4-5-6

1-2-7-8-9-10

It appears that the index "11" and the favourite number corresponding to this index do not form part of the model combinations $MC_j$ and the combinations $C_j$ respectively. For this reason, the set p=3 and n=11 is not considered to be efficient since one favourite number is not used. However, it may be kept as a valid set available to the player.

Processor 18 is preferably a custom computer integrated circuit as described in FIG. 3 and its operation is as follows.

The Clock Circuit 22 consists of a resistor/capacitor network to complete the closed loop oscillator circuit at the system clock generator 100.

The system clock generator 100 contains an oscillator circuit which supplies a free running frequency of operation to the clock control 102 which divides into lower frequencies in order to provide proper timing values to the main operation of the microprocessor, the LCD controller 104 and the timer circuit 106. The timer 106 is used to provide specific timing intervals for keyboard scanning and various time delays, by issuing an interrupt signal to the interrupt control 108 circuit.

Information is exchanged between different sections of the microprocessor via a main data bus 110. Each program instruction is stored at a location in the program memory (ROM) 112, each of which is sequentially addressed by program counter 114. As each instruction is read, the instruction decoder 116 performs the appropriate actions to the other sections of the microprocessor in order that the desired actions result. These actions may be one or more of the following tasks:

(a) Transfer data between the multi-purpose registers 118 where data may be temporarily stored in a directly addressable manner—to ALU (Arithmetic-Logic Unit) 120 where arithmetic and logic functions take place—and back.

(b) Transfer data between the multi purpose registers 118 and data memory 122 where most of the temporary information is stored, such as display data, the information entered by the user etc., and other 'scratch-pad' data which may result from any particular executed instruction.

(c) Between the multi-purpose registers and one of the input/output ports, port A 124, port B 126, port C 128—from which the keyboard scanning (reading) occurs—or the serial interface 130 from which the data to be printed is output, along with a serial clock line for synchronizing purposes.

The LCD controller/driver 104 circuit receives its clock source from the clock control circuit 102 to provide proper timing signals and scanning rate to the LCD display 16. The LCD controller/driver 104 reads information from the data memory 112 as to what is to be displayed and where it should be displayed. Display information which results from the execution of particular program instructions is automatically updated at the display.

The printer interface in its simplest form is a connector 13 which is provided at the case of the unit (see FIG. 1).

For example, a processor which may be used with the apparatus embodying this invention is manufactured by Nippon Electric Corporation, under the number UPD7514. This processor is custom programmed by the manufacturer. One possible operation of pocket size apparatus 10 may generally be described as follows.

A. The player enters the amount of favourite numbers n ranging from 8 to 18. Any value out of this range will cause an "OUT OF RANGE" message to appear at the display for a short period of time after which a valid value must be entered.

B. The player enters a number p selected from between 3, 4 and 5 as being the desired prize group, that is to say the value to reflect the minimum prize win (3/6, 4/6, 5/6) should all 6 numbers drawn be among the list of n favourite numbers to be entered.

C. The player at this point may check the number of combinations required to be played for the favourite numbers and for the prize group selected, according to the table of FIG. 6. For example, for 10 favourite numbers and for prize group 5, 18 combinations of 6 numbers will be generated. For 14 favourite numbers with a desired prize group of 4, 26 combinations of 6 numbers will be generated. This allows the player to apply his own judgement over the amount of money to wager versus the odds of winning a specific prize. Should the player decide that the number of combinations is too high, he may cancel his initial entries and start again with a more appropriate set of n and p values.

D. The player enters a list of favourite numbers to form sub-array $a_i$, up to the amount n, as previously entered, to be used in the generation of the set of combinations of 6 numbers.

E. Upon a command the apparatus generates the various combinations of 6 numbers taken from sub-array $a_i$ and in accordance with the particular model set of combinations $S^p{}_n$ contained in the ROM memory 32.

F. The player then places his bets with the local lottery office and eventually he compares the result of the draw with his selection. To this effect the apparatus may be used to simplify the task. To perform this function, the player must first enter the amount of favourite numbers, then the selected prize group, then the actual list of favourite numbers, all in the exact manner as was performed in generating the wagered combination and then finally the winning combination of 6 numbers, plus, if applicable, the bonus number, assuming one to be available for the lottery game being played. The winning sets, if any, will then be displayed at 16 along with the corresponding prize group namely 3/6, 4/6, 5/6, 5/6+ (which indicates 5 out of 6 plus the bonus), or 6/6. This allows the player to perform a rapid check on the combinations generated and played.

G. If it is desired to generate single random numbers, the player enters the random number generator mode, then sets up the upper limit of the range of numbers from which the random selection is to be made. These numbers can be used as the favourite numbers to be used for combinations selection as described above, or as supplementary numbers which the player may wish to add to his own list of favourite numbers.

H. The apparatus can also be used to generate random combinations of 6 numbers ranging between 1 and any particular high limit as may be set by the player.

I. Should the player require the random selection of numbers of 3, 4 or 5 digits, the apparatus will generate sets of permutations of size q where each digit is comprised between 0 and 9 and can be repeated. This allows the player to play other types of number games such as daily lotteries and the like.

Figure 2:
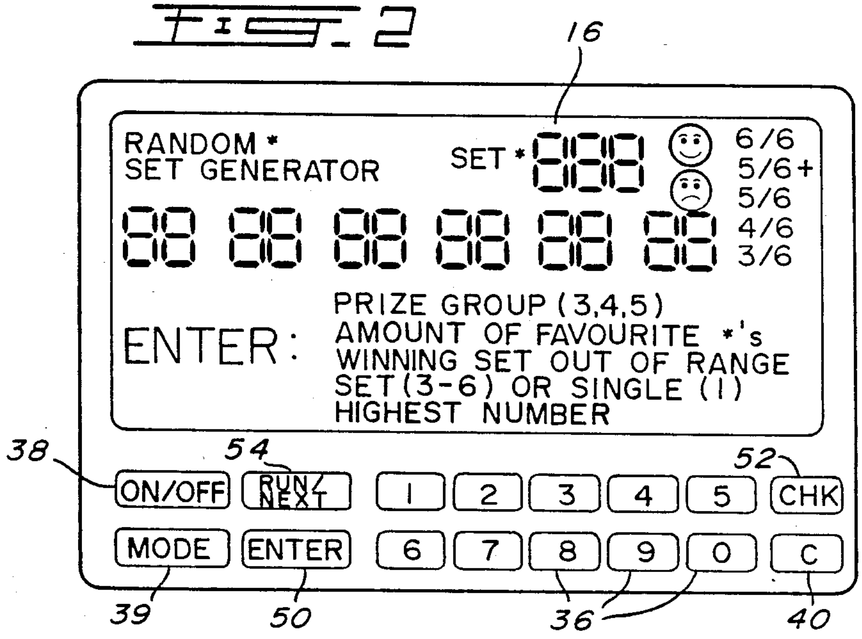
FIG. 2 is a plan view of the apparatus of FIG. 1 illustrating in a detailed manner the visual display and the keyboard.

Referring now more specifically to FIGS. *7a* through *7e* and FIG. 2, the detailed method of utilisation of the apparatus will now be explained. On FIG. *7a* is illustrated a key 37 for the symbols used throughout FIGS. *7a* to *7e*.

1—To activate the unit the ON/C key 38 is pressed (7a10) which causes display 16 to display the following messages: "SET GENERATOR 00 ENTER AMOUNT OF FAVOURITE #'s"(7a12).

At any point in time, pressing the MODE key 39 (7a14) will cause the unit to stop current operations and toggle the mode, i.e. from "SET GENERATOR" mode to "RANDOM NUMBER GENERATOR" mode or vice versa.

At any point in time, it the OFF key 40 (7a16) is pressed, the unit will turn off, terminating all operations.

If there have not been any key operations for a predetermined period of time, the unit is designed to automatically shut itself off in order to save the batteries 20.

2—When it is desired to operate the apparatus in the "SET GENERATOR" mode the following operations are carried out. The amount of favourite numbers must be entered. The number is entered via numeric keys 36 comprised between 0 and 9. The number of favourite numbers must be between 8 and 18 in order to stay within the range of the apparatus. Each digit is keyed is displayed at display 16 and if a mistake is made in the entry the ON/C key 38 will clear the entry and display, allowing another number to be entered. When the ENTER key 50 is pressed, the entry is made into the memory for later use. If the number entered is less than 8 or greater than 18, the "OUT OF RANGE" prompt will turn on for a few seconds and then turn off along with clearing the value at display 16 (7a18). A valid value must be reentered whereupon the "ENTER" prompt will turn off leaving the "AMOUNT OF FAVOURITE #'s" prompt on display 16 with the entered numbers also displayed (7a20). This display will remain on for a few seconds to allow the user to visually acknowledge the entry.

3—The previously displayed information then turns off and the "ENTER PRIZE GROUP (3,4,5)" prompt is turned on (7a22). At this point, the only active keys are numeric keys 3, 4, and 5. When the appropriate key is pressed the corresponding prize group will be displayed at display 16 (7a24).

If the ON/C key 38 is pressed the entered value at the display will be cleared and the entry must be performed again (7a26).

In order to enter the desired prize group into the memory, the ENTER key 50 must be pressed (7a28). If the "FAVOURITE NUMBER" and "PRIZE GROUP" combination is not valid or economical (that is to say, does not appear in the table of FIG. 6), the "OUT OF RANGE" prompt will turn on for a few seconds. The number of FAVOURITE NUMBERS, and the PRIZE GROUP must be therefore be reentered, using the procedure set out above.

4—Once the desired number of FAVOURITE NUMBERS and PRIZE GROUP values have been entered, a delay of a few seconds occurs (7a30) to allow the user to visually acknowledge the entered value. Then the "ENTER FAVOURITE #'s" prompt appears.

Pressing the CHK key 52 allows the player to check the number of combinations which are to be generated as a result of the selections made thus far. This number is displayed at display 16 and stays on until the CHK key 52 is pressed again.

5—The "ENTER FAVOURITE #'s" prompt will appear again (7b10) and then the player enters the selected or favourite numbers one by one via numeric keys 36 (7b11) and ENTER key 50 (7b12). The favourite number count will be displayed in the first line of display 16 (7b14) and the favourite number is displayed in the second line of display 16 (7b16). Upon pressing ENTER key 50 the favourite numbers count is incremented and the favourite numbers which appear in the second line of display 16 are shifted to the left and this process is repeated until all the favourite numbers have been entered.

Entry of a favourite number which exceeds the upper limit of 63 the "OUT OF RANGE" prompt is displayed for a few seconds after which the "ENTER FAVOURITE #'s" prompt comes on again, the count is not incremented and the last 2 digits in the second line of display 16 are cleared thereby allowing the entry of an acceptable favourite number. In the case of a 6/49 lottery game, the upper limit of course is 49 and consequently any favourite number exceeding 49 may be accepted by the apparatus but would not be a valid number for placing one's stake.

Once all favourite numbers have been entered, the only active keys are the RUN/NEXT key 54 (7b18), and the CHK key 52 (the MODE key 42 and the OFF key 40 are of course always active).

If the CHK keys 52 is pressed, the unit will enter the winning set mode to check the combination of 6 numbers which were actually drawn against a list of previously generated sets as will be described hereinafter in greater detail.

6—When the RUN/NEXT key 54 is pressed, the "ENTER FAVOURITE #'s" prompt is removed and the "SET #" message is displayed in the first line of display 16 and all numeric digits in the second line of display 16 are set to 0 (7c10). To generate combinations of 6 numbers, the RUN/NEXT key 54 is pressed (7c12). This causes a first combination to be displayed in the second line of display 16 and the set number count is displayed in the top line of display 16. Each combination remains on display until the RUN/NEXT key 54 is pressed again at which time the next combination of 6 numbers is generated and displayed and the set number count is incremented (7c14). The process is repeated until all of the combinations have been generated. The "OUT OF RANGE" message will appear when all sets have been generated and displayed. If a printer option is attached, each generated and displayed combination along with the set # will be printed as displayed at display 16.

7—For operating the apparatus in the random number generator mode, the mode key 39 must be pressed after which the size of the sets must be determined. Upon entering the random number generator mode, the "RANDOM NUMBER GENERATOR" message and the "ENTER SET (3-6) OR SINGLE (1)" prompt will be displayed along with setting to zero one digit in the first line of display 16 (7d10). Digit keys 1, 3, 4, 5 and 6 remain active to enable the player to select the number of digits of the random numbers to be selected. Depending upon the key pressed, the apparatus will assume the following:

1 key—single random numbers are to be generated, ranging from 1 to the "highest number" (the next operation to be performed by the user). This option is to be used to select "favourite" numbers of compliment the player's own "favourite" numbers for later usage in the "SET GENERATOR" mode (7e10).

3 key—3 digit random numbers are to be generated, ranging from 000 to 999 (permutations). This option is to be used to select 3 digit numbers for lottery games such as daily numbers games (7e12).

4 key—4 digit random numbers are to be generated, ranging from 0000 to 9999 (permutations). This option is to be used to select random 4 digits numbers for lottery games such as daily numbers games (7e14).

5 key—5 digit random numbers are to be generated, ranging from 00000 to 99999 (permutations). This option is to be used to select random 5 digit numbers for lottery games such as daily numbers games (7e16).

6 key—This option differs from 3,4 and 5 in that the 6 numbers generated for each set are grouped as combinations (non-repeating numbers such as 1 2 3 4 5 6, where 1 1 2 2 3 3 etc. is not allowed) rather than as permutations (repeatable numbers such as 1 1 1 etc.). Repeating numbers may occur between sets (i.e. all numbers from 1 to the "highest number" are set "free" after each set of 6 numbers is generated). This option is to be used to generate random combinations of 6 numbers which have no systematic approach to their selection and no inter-relationship between each set (7e18).

Once the choice is made, the ENTER key is to be pressed (7d14). The display prompt "ENTER SET (3-6) OR SINGLE(1)" is removed, the number is entered into memory and digit 15 is cleared.

SET HIGHEST NUMBER. The sequence of events to set the upper limits (highest number to be generated) occur only if keys 1 or 6 had been selected as described above. Options 3, 4 and 5 do not require this parameter therefore this section would by-passed (7d15).

The "ENTER HIGHEST NUMBER" prompt is displayed and the first line of display 16 is set to 00. The upper limit (or so called the "highest number") is the highest possible number to be yield by the random number generator. For example, for a lottery which selects numbers between 1 and 36, the user would set the "highest number" to 36. The "highest number" can range from 6 to 63 to give the greatest flexibility for the many lottery games in operation. As the entry is made via the keypad, the number is displayed at the first line of display 16 (7d16).

To clear the value, or to correct an error, the ON/C key must be pressed, thereby clearing the display allowing the user to re-enter the desired number (7d18).

To enter the value into memory, the ENTER key must be pressed which then removes the "ENTER" prompt at which point the display 16 is prepared for the display of the random numbers to be generated (7d20).

GENERATING THE NUMERS OR SETS. When the RUN/NEXT key is pressed the first random number or set will be displayed at the second line of display 16 while the value at the count line of display 16 will be incremented to a '1', and, if the printer option is attached, a print out of the random number or set will occur (7e20).

For every depression of the RUN/NEXT key (7e22) a new random number or set will be generated and displayed (and printed if applicable). The count value of the amount of numbers or sets generated is also updated.

To exit the "RANDOM NUMBER GENERATOR" mode and enter into the "SET GENERATOR" mode, the MODE key must be pressed once; to repeat the "RANDOM NUMBER GENERATOR" mode, the MODE key must be pressed twice (2×); to turn off the unit the OFF key must be pressed. WINNING SET MODE (not illustrated on FIGS. 7*a*–7*e*) To enter into winning set mode firstly amount of favourite #'s, the desired prize group size and the list of the favourite numbers must be entered and then the CHK key is pressed. The "FAVOURITE #'s" prompt is removed and the "ENTER WINNING SET" prompt is displayed. The winning numbers which were drawn should be entered via the keypad. As each number is entered, the ENTER key must be pressed, which then places the number into memory and shifts the set digits left, clearing the 2 most right digits for the next entry. Once the 6 main numbers are entered, a "b" is displayed at the first line of display 16. If a bonus number is included in the draw, it should be entered which will be displayed to the right of the "b"; if a bonus number is not included, a zero must be entered.

Upon completion of entering the winning numbers, the "ENTER" prompt is removed and after a short delay, zeros are displayed at the second line of display 16. To start displaying the winning sets, the RUN/NEXT key must be pressed. If no winning sets have resulted from those generated, the "OUT OF RANGE" message will appear upon pressing the key. If winning sets have been found, the set will be displayed at the second line of display 16, while the set number will be displayed at the first line of display 16 (in order to cross reference the winning ticket), and the appropriate prize group message (3/6 or 4/5 or 5/6 or 5/6+ or 6/6) will appear. If the printer option is attached, a printout of the winning combinations, set #, and prize group will occur.

To obtain the remaining winning sets, the RUN/NEXT key must be pressed successively, until the "OUT OF RANGE" message appears, signifying all of the winning sets have been displayed.

This completes the "WINNING SET" mode of operation. To enter into the "RANDOM NUMBER GENERATOR" mode, the MODE key must be pressed once; to return to the "SET GENERATOR" mode, the MODE key must be pressed twice (2×); to turn off the unit, the OFF key must be pressed.

Although the invention has been described in relation to preferred forms, it will be evident to the person skilled in the art that it may be modified and refined in various ways. It is therefore wished to have it understood that the present invention should not be limited into interpretation except by the terms of the following claims.

I claim:

1. An electronic apparatus for generating combinations of numbers to be used by a player when selecting his bets for a lottery game of the 6/36, 6/44 or 6/49 type more generally expressed as m/k wherein m is the number of distinct numbers forming a combination $C_j$ and wherein said distinct numbers being chosen from an array $A_k$ constituted by a number k of consecutive numbers usually ranging from 1 to k, said apparatus generating a plurality of different combinations $C_j$ taking into consideration parameters dictated by the player, said apparatus comprising:

input means for entering said parameters, namely for entering n distinct selected numbers chosen from said array $A_k$ thus forming a sub-array $a_i$ wherein n is greater than m and less than k, and for entering p, a redundancy index whose numerical value is less than m;

processor means operatively connected to said input means for storing said n distinct selected numbers and said redundancy index p, said processor means successively generating a comprehensive series of combinations $C_j$ of said distinct selected numbers n chosen from said sub-array $a_i$, the combinations $C_j$ from said comprehensive series satisfying a predetermined relationship with the selected redundancy index p; and output means operatively connected to said processor means for successively outputting the combinations $C_j$ generated by said processor means.

2. Apparatus as defined in claim 1 wherein said processor means comprises memory means for storing the numerical values of n and p and for storing every distinct selected number of said sub-array $a_i$, said memory means also having a plurality of read only memories (ROM) areas, there being a ROM area for each set of n and p values, each ROM area containing a complete set of model combinations of m slots each corresponding to the limitations imposed by its associated n and p values, said processor means also comprising means for correlating each selected number of said sub-array $a_i$ with a particular slot of the corresponding ROM area, said input means comprising a combination display key which, when actuated (a) causes said processor means to generate said combinations $C_j$ by accessing the ROM area corresponding to said p and n values and forming said combinations $C_j$ of m selected numbers of said sub-array $a_i$, in accordance with the model combinations stored in said last mentioned ROM area, and (b) causes successive outputting of said combinations $C_j$ by said output means.

3. Apparatus as defined in claim 2 wherein said memory means comprises a register for storing m numerical values, said processor means generating said combinations $C_j$ one-by-one in succession by loading combinations of m selected numbers of said sub-array $a_i$ into said register, chosing said selected numbers in accordance with the model combinations stored in said ROM area.

4. Apparatus as defined in claim 1 wherein said input means is constituted by a plurality of function keys for controlling the operation of said apparatus and numeric keys for entering numerical data.

5. Apparatus as defined in claim 4 wherein said output means is constituted by a visual display means.

6. Apparatus as defined in claim 5 wherein said processor means comprises memory means for storing the numerical values of n and p and for storing every distinct selected number of said sub-array $a_i$ of favourite numbers; wherein said memory means also comprises a plurality of read only memories (ROM) areas, there being one ROM area for every valid value of p, each ROM area containing a model set $MS_p$ of model combinations $MC_j$ of m slots each; wherein the model set $MS_p$ is constituted by a plurality of subsets $S^P{}_n$, there being one subset $S^P{}_n$ for every valid value of n, each subset $S^P{}_n$ containing a complete set of model combinations $MC_j$ corresponding to the limitations imposed by the associated values of n and p, the subet $S^P{}_n$ corresponding to the maximum allowed value of n being equal to the model set $MS_p$; wherein the model combinations in any subset $S^P{}_n$ includes all of the model combinations of every subset for lesser n values $$(S^P{}_{n-1} \subset S^P{}_n);$$

wherein said processor means also comprises means for correlating each selected number of said sub-array $a_i$ with a particular slot of the corresponding ROM area; and wherein said input means comprising a combination display key which, when actuated:

(a) causes said processor means to generate said combinations $C_j$ by accessing the ROM area to the value of p and accessing therein the subset $S^P{}_n$ corresponding to the value of n, said processor means forming said combinations $C_j$ of m selected numbers of said sub-array $a_j$, in accordance with the model combination $MC_j$ extracted from the last mentioned subset $S^P{}_n$, and (b) causes successive display of said combinations $C_j$ by said display means.

7. Apparatus as defined in claim 6 wherein said memory means comprises a register for storing m numerical values, said processor means generating said combinations $C_j$ one-by-one in succession by loading combinations of m selected numbers of said sub-array $a_i$ into said register, chosing said selected number in accordance with the model combinations stored in said ROM area.

8. Apparatus as defined in claim 7 wherein upon display of a combination $C_j$, re-actuation of said combination display key is required for the display of combination $C_{j+1}$.

9. Apparatus as defined in claim 6 wherein said processor means comprises means for causing said display means to display the p and n values after entry via said keyboard means of said n selected numbers and of said redundancy index p.

10. Apparatus as defined in claim 9 wherein said processor means comprises means for causing said display means to display the number of model combinations stored in the subset $S^P{}_n$ corresponding to the set of the last mentioned p and n values provided that the set of p and n values entered in the apparatus is one to which a subset $S^P{}_n$ corresponds.

11. Apparatus as defined in claim 10 wherein said message display section comprises a distinct message for the display of the n and p values or for the display of said number of model combinations.

12. Apparatus as defined in claim 5 wherein said display means comprises a digit display section and a message display section for displaying alphabetic messages for the information of the player, said message display section comprising an out-of-range signal, and wherein said processor means causes display of said out-of-range signal instead of generating combinations $C_j$, whenever the player selects and enters in the apparatus a set of n and p values to which no subset $S^P{}_n$ corresponds or whenever a selected number greater than k is keyed on said keyboard means, or an entry of a number previously entered into array $a_i$ is attempted.

13. Apparatus as defined in claim 12 wherein said message display section comprises a plurality of parameter messages and wherein said processor means causes display of one of said parameter messages to inform the player of the need for entry of an instruction or value through said keyboard in order to allow further operation of said processor means, said processor means remaining inactive in the interim for at least a predetermined period of time.

14. Apparatus as defined in claim 5 wherein said function keys on said keyboard means include a mode key and wherein said processor means also comprises random number generation means for randomly generating and displaying on said display means numerical values within any one of a plurality of ranges of numerical values, said mode key being actuable by the player for operating said random number generation means and for deactivating same.

15. Apparatus as defined in claim 14 wherein said display means comprises a digit display section and a message display section for displaying alphabetic messages for the information of the player, said message display section comprising a random number selection mode display signal which turns on upon actuation of said mode key for operating said random number generation means.

16. Apparatus as defined in claim 15 wherein said processor means also comprises random combination generation means for generating successive combinations of m numerical values ranging from 1 to k, said message display section also comprising a random combination generation mode signal which indicates operation of said random combination generation means.

17. Apparatus as defined in claim 15 wherein said processor means comprises a permutation generator means for generating randomly sets of g digit numbers, each digit ranging from 0 to 9, q being chosen in the group comprising the values 1, 3, 4 and 5.

18. Apparatus as defined in claim 14 wherein said message display section also comprises a combination selection mode signal which turns on upon actuation of said mode key for deactivating said random number generation means.

19. Apparatus as defined in claim 5, wherein said processor means also comprises a winning combination comparison means and a winning combination register which may be loaded with the numerical values of a winning combination of m+1 numbers, said winning combination comparison means being operable by entering the input parameters identical to those used for wagering whereupon by activating the check mode of operation the processor means generates the combinations $C_j$ corresponding to the values of the input parameters, said winning combination comparison means comparing the generated combinations $C_j$, one by one with the winning combination stored in said winning combination register, said winning combination comparison means retaining the combinations $C_j$ which have at least a predetermined number of elements in common with the winning combination stored in said winning combination register, said winning combinations comparison means causing said display means to display, the retained combinations $C_j$ together with the extent of the win.

20. An electronic apparatus for generating combinations of numbers to be used by a player when selecting his bets for a lottery game of the 6/36, 6/44 or 6/49 type more generally expressed a m/k wherein m is the number of distinct numbers forming a combination $C_j$ and wherein said distinct numbers being chosen from an array $A_k$ constituted by a number k of consecutive numbers usually ranging from 1 to k, said apparatus generating a plurality of different combinations $C_j$ taking into consideration parameters dictated by the player, said apparatus comprising:

input means for entering said parameters, namely for entering n distinct selected numbers chosen from said array $A_k$ thus forming a sub-array $a_i$ wherein n is greater than m and less that k, and for entering p, a redundancy index whose numerical value is less than m;

processor means operatively connected to said input means for storing said n distinct selected numbers and said redundancy index p, said processor means successively generating a comprehensive series of combinations $C_j$ of said distinct selected numbers n chosen from said sub-array $a_i$ except combinations $C_j$ thereof which comprise at least p distinct numbers in common with any previously generated combination $C_j$; and output means operatively connected to said processor means for successively outputting the combinations $C_j$ generated by said processor means.

21. An electronic apparatus for generating combinations of numbers to be used by a player when selecting his bets for a lottery game of the 6/36, 6/44 or 6/49 type more generally expressed as m/k wherein m is the number of distinct numbers forming a combination $C_j$ and wherein said distinct numbers being chosen from an array $A_k$ constituted by a number k of consecutive numbers usually ranging from 1 to k, said apparatus generating a plurality of different combinations $C_j$ taking into consideration parameters and references dictated by the player, said apparatus comprising:

input means for entering said parameters, namely for entering n distinct selected numbers chosen from said array $A_k$ thus forming a sub-array $a_i$ wherein n is greater than m and less than k, and for entering p, a redundancy index whose numerical value is less than m;

processor means operatively connected to said input means for storing said n distinct selected numbers and said redundancy index p, said processor means successively generating a comprehensive series of combinations $C_j$ of said distinct selected numbers n chosen from said sub-array $a_i$ except all the combinations $C_j$ thereof which comprise at least p distinct numbers in common with any previously generated combination $C_j$; and output means operatively connected to said processor means for successively outputting the combinations $C_j$ generated by said processor means.

22. A pocket size apparatus for generating combinations of numbers to be used by a player when selecting his bets for a lottery game of the 6/36, 6/44 or 6/49 type more generally expressed a m/k wherein m is the number of distinct numbers forming a combination $C_j$ and said distinct numbers being chosen from an array $A_k$ constituted by a number k of consecutive numbers usually ranging from 1 to k, said pocket size apparatus generating a plurality of different combinations $C_j$ taking into consideration parameters dictated by the player, said pocket size apparatus comprising:

keyboard means having function keys for controlling the operation of said apparatus and numeric keys for entering numerical data, said numeric keys being used for entering said parameters, namely for entering n distinct selected numbers chosen from said array $A_k$ thus forming a sub-array $a_i$ wherein n is greater than m and less than k, and for entering p, a redundancy index whose numerical value is less than m;

processor means operatively connected to said keyboard means for storing said n distinct selected numbers and said redundancy index p, said processor means successively generating a comprehensive series combinations $C_j$ of said distinct selected numbers n chosen from said sub-array $a_i$ except the combinations $C_j$ thereof which comprise at least p distinct numbers in common with any previously generated combination $C_j$; and display means operatively connected to said processor means for successively displaying the combinations $C_j$ generated by said processor means and wherein said processor means comprises memory means for storing the numerical values of n and p and for storing every distinct selected number of said sub-array $a_i$, said memory means also having a plurality of read only memory (ROM) areas, there being one ROM area for every valid value of p each ROM area containing a model set $MS_p$ of model combinations $MC_j$ of m slots each, the model set $MS_p$ being constituted by a plurality of subsets $S^pn$, there being one subset $S^pn$ for every valid value of n, each subset $S^pn$ containing an exhaustive set of model combinations $MC_j$ corresponding to the limitations imposed by the associated values of n and p, the subset $S^Pn$ corresponding to the maximum allowed value of n and being equal to the model set $MS_p$, the subsets being interrelated according to the following relationship:

$$S^P_{n-1} \subset S^P_n$$

said processor means also comprising means for correlating each selected number of said sub-array $a_i$ with its corresponding slots of the model combination, said keyboard means comprising among its function keys a combination display key which, when actuated (a) causes said processor means to generate said combinations $C_j$ by accessing the ROM area correspondin, to said p and accessing therein the subset $S^Pn$ corresponding to the value of n, said processor means forming combinations $C_j$ of m selected numbers of said sub-array $a_i$, in accordance with the model combination extracted from the last mentioned subset $S^Pn$ and (b) causes successive display of said combinations $C_j$ by said display means.

* * * * *